United States Patent
Städele et al.

(10) Patent No.: US 9,731,563 B2
(45) Date of Patent: Aug. 15, 2017

(54) TIRE PRESSURE MEASURE ON A VEHICLE

(71) Applicant: AGCO International GmbH, Neuhausen am Rheinfall (CH)

(72) Inventors: Alexander Städele, Marktoberdorf (DE); Christian Pischulti, Marktoberdorf (DE); Benjamin Schmölz, Marktoberdorf (DE)

(73) Assignee: AGCO International, Neuhausen (CH)

( * ) Notice: Subject to any disclaimer, the term of this patent is extended or adjusted under 35 U.S.C. 154(b) by 438 days.

(21) Appl. No.: 14/472,742

(22) Filed: Aug. 29, 2014

(65) Prior Publication Data

US 2015/0059919 A1    Mar. 5, 2015

(30) Foreign Application Priority Data

Aug. 29, 2013 (GB) .................................. 1315427.3

(51) Int. Cl.
*B60C 23/02* (2006.01)
*B60C 23/00* (2006.01)

(52) U.S. Cl.
CPC ............ *B60C 23/003* (2013.01); *B60C 23/02* (2013.01)

(58) Field of Classification Search
CPC ..... B60C 23/00; B60C 23/001; B60C 23/003; B60C 23/02; B60C 23/04
USPC .............. 141/38; 73/40, 48, 49, 146.2–146.3
See application file for complete search history.

(56) References Cited

U.S. PATENT DOCUMENTS

| | | | |
|---|---|---|---|
| 4,782,879 A | 11/1988 | Le Chatelier et al. | |
| 5,293,919 A * | 3/1994 | Olney | B60C 23/004 137/225 |
| 5,413,159 A * | 5/1995 | Olney | B60C 23/004 152/418 |
| 5,465,772 A * | 11/1995 | Sartor | B60C 23/003 137/487.5 |
| 5,540,268 A | 7/1996 | Mittal | |
| 5,767,398 A * | 6/1998 | Naedler | B60C 23/003 73/146.2 |
| 6,144,295 A * | 11/2000 | Adams | B60C 23/003 137/224 |
| 6,269,691 B1 * | 8/2001 | Sowatzke | B60C 23/10 141/38 |

(Continued)

FOREIGN PATENT DOCUMENTS

DE    3246601 A1    6/1984
DE    10221723 A1    12/2003

(Continued)

OTHER PUBLICATIONS

European Patent Office, International Search Report for related EP Application No. 14178295, dated Feb. 13, 2015.

(Continued)

*Primary Examiner* — Nicolas A Arnett (57) ABSTRACT

A tire pressure control arrangement for a vehicle having at least two tires connected to an air supply. Each tire is connected to the air supply via a supply line having a first valve connected to a second valve. The arrangement further includes a pressure sensor between the two valves. The first valve is closed while the supply line is connected to a pressure supply and the pressure in the supply line is monitored for a pre-determined period of time by a control system on the vehicle to detect whether there are any leaks in the arrangement.

12 Claims, 5 Drawing Sheets

(56) References Cited

U.S. PATENT DOCUMENTS

| | | | | |
|---|---|---|---|---|
| 6,591,671 B2* | 7/2003 | Brown | ............... | B60C 23/0408 340/442 |
| 7,528,705 B2* | 5/2009 | Brown, Jr. | .......... | B60C 23/0401 340/442 |
| 8,245,746 B2* | 8/2012 | Stanczak | ................ | F04B 41/02 152/415 |
| 8,973,633 B2* | 3/2015 | Wilson | ................. | B60C 23/003 152/415 |
| 9,132,704 B2* | 9/2015 | Wilson | ................. | B60C 23/003 |
| 2011/0148617 A1 | 6/2011 | Kusunoki et al. | | |
| 2012/0024445 A1* | 2/2012 | Wilson | ................. | B60C 23/003 152/415 |
| 2012/0059546 A1* | 3/2012 | Wilson | ................. | B60C 23/003 701/34.4 |
| 2015/0101702 A1* | 4/2015 | Dean | .................... | B60C 23/003 141/4 |
| 2016/0375730 A1* | 12/2016 | Kona | ................... | B60C 23/003 141/4 |

FOREIGN PATENT DOCUMENTS

| | | |
|---|---|---|
| DE | 102009057579 A1 | 6/2011 |
| FR | 2962939 A1 | 1/2012 |

OTHER PUBLICATIONS

Search Report dated Apr. 10, 2014, prepared by UK Patent Office for GB Patent Application #1315427.3

* cited by examiner

TIRE PRESSURE MEASURE ON A VEHICLE

BACKGROUND OF THE INVENTION

Field of Invention

This invention relates to a tire pressure control system (TPCS) having a rotatable air passage. In particular this invention relates to a tire pressure control system for measuring the tire pressure on an agricultural vehicle, or machine having a rotatable air passage.

Description of Related Art

In order to improve efficiency and safety of an agricultural machine, or an agricultural vehicle such as an agricultural tractor, it is necessary to change the pressure of the tires depending on whether the tractor is operating, or on the road. When operating in the field, lower tire pressures are required to reduce ground pressure and compaction and to improve the grip of the tires with the earth. For road work, higher tire pressures are required to reduce rolling resistance (which affects the efficiency of the tractor) and to reduce heat generation (which affects the safety of the tractor). The pressures of the tires may typically be varied by 0.6 bar-2.5 bar when moving between field and road surfaces.

Known tire pressure control systems (TPCS) suffer from the fact that the integrity, that is the air tightness of the tire inflation arrangement, for example the integrity of the tire valves is not monitored sufficiently during operation.

Two methods (described below as method A and method B) are generally known to be used to detect leakages during inflation and deflation of a tire on a vehicle:

Method A. When inflating or deflating the tire, the pressure control system checks the integrity of the arrangement by checking whether the target, or desired tire pressure can be reached within a pre-determined time. If not, a leakage is likely. This has the major disadvantage that in the case of a large tire pressure increase, the TPCS is in operation for a long time because of the lengthy inflation time before the failure is detected.

Method B. Each tire is equipped with a pressure sensor. The sensor is used to monitor the tire pressure permanently or temporarily assuming that a change in tire pressure without actively changing the tire pressure via TPCS indicates a leakage. This may work for the tire itself but leakages in the supply line, especially in the pipes, hoses and rotary passages outside of the tire cannot be monitored. This may again require method A. Furthermore, method B requires pressure sensors in all tires which has cost implications.

The known methods do not offer a monitoring system for a TPCS which can be operated without changing the tire pressure, or which can monitor the integrity of components outside of the tire.

OVERVIEW OF THE INVENTION

It is an object of the present invention to provide an alternative tire pressure control arrangement which can be used to monitor the integrity of the TPCS supply circuit. It is a further object of the present invention to provide a method of using the tire pressure control arrangement to detect a leak in the arrangement.

According to the invention there is provided a tire pressure control arrangement for a vehicle having at least two tires connected to an air supply, each tire connected to an air supply via a respective supply line having a respective valve means, said respective valve means connected to a second valve means, said arrangement further comprising a pressures sensor between said respective valve means and the second valve means, characterised in that the respective valve means is closed while the supply line is connected to a reference pressure supply and said reference pressure in the supply line is monitored for a pre-determined period of time by a control system on the vehicle to detect whether there are an leaks in the arrangement.

The arrangement allows for the detection of leakages in the supply line, or the respective valve means, or the second valve means when the vehicle is not in operation. When a vehicle operator returns to the vehicle, he or she can easily see if there are any changes in the reference pressure and therefore whether there are any leaks within the arrangement.

Preferably, the supply line is connected to a reference pressure supply by connecting the second valve means to a vehicle air supply, or to the atmosphere.

Preferably, the supply line is connected to a reference pressure supply by connecting a main control valve to a vehicle air supply or to the atmosphere, said main control valve being connected to the second valve means.

The second valve means is preferably closed after connection to the reference pressure supply. This means that the reference pressure supply is not continuously being used and means the supply line is closed and therefore the reference pressure easily monitored.

When the respective valve means and the second valve means are closed, the reference pressure between the respective valve means and the second valve means is measured and if a decrease or increase in pressure is detected, a warning signal is preferably generated. This means that the operator on return to the vehicle is immediately informed of the condition of the tire arrangement.

Preferably, the vehicle comprises four tires, each having a respective supply line with respective valve means connected to the pressure sensor.

Preferably, two tires or one axle are connected to a first main control valve and a further two tires, or a second axle are connected to a second main control valve.

Preferably, a second valve means is opened while a respective valve is closed to provide a reference pressure in the supply line and said reference pressure is monitored for a pre-determined period of time by a control system on the vehicle.

Preferably, a warning signal is generated if the reference pressure in the supply line changes within said pre-determined period of time indicating a leak in the supply line, or the respective valve means, or the second valve means.

In accordance with a further aspect of the invention, there is provided a method of using the tire pressure control arrangement wherein the supply line is connected to the reference pressure supply by connecting the second valve means to the vehicle air supply or to atmospheric pressure.

Preferably, the supply line is connected to the reference pressure supply by connecting a main control valve to the vehicle air supply, or to atmospheric pressure.

Preferably, the second valve means is closed after the supply line has been connected to a reference pressure supply.

BRIEF DESCRIPTION OF THE DRAWINGS

The invention will now be described, by way of example only, with reference to the drawings, FIGS. 1 to 5, in which.

DETAILED DESCRIPTION OF THE INVENTION

Figure 1:
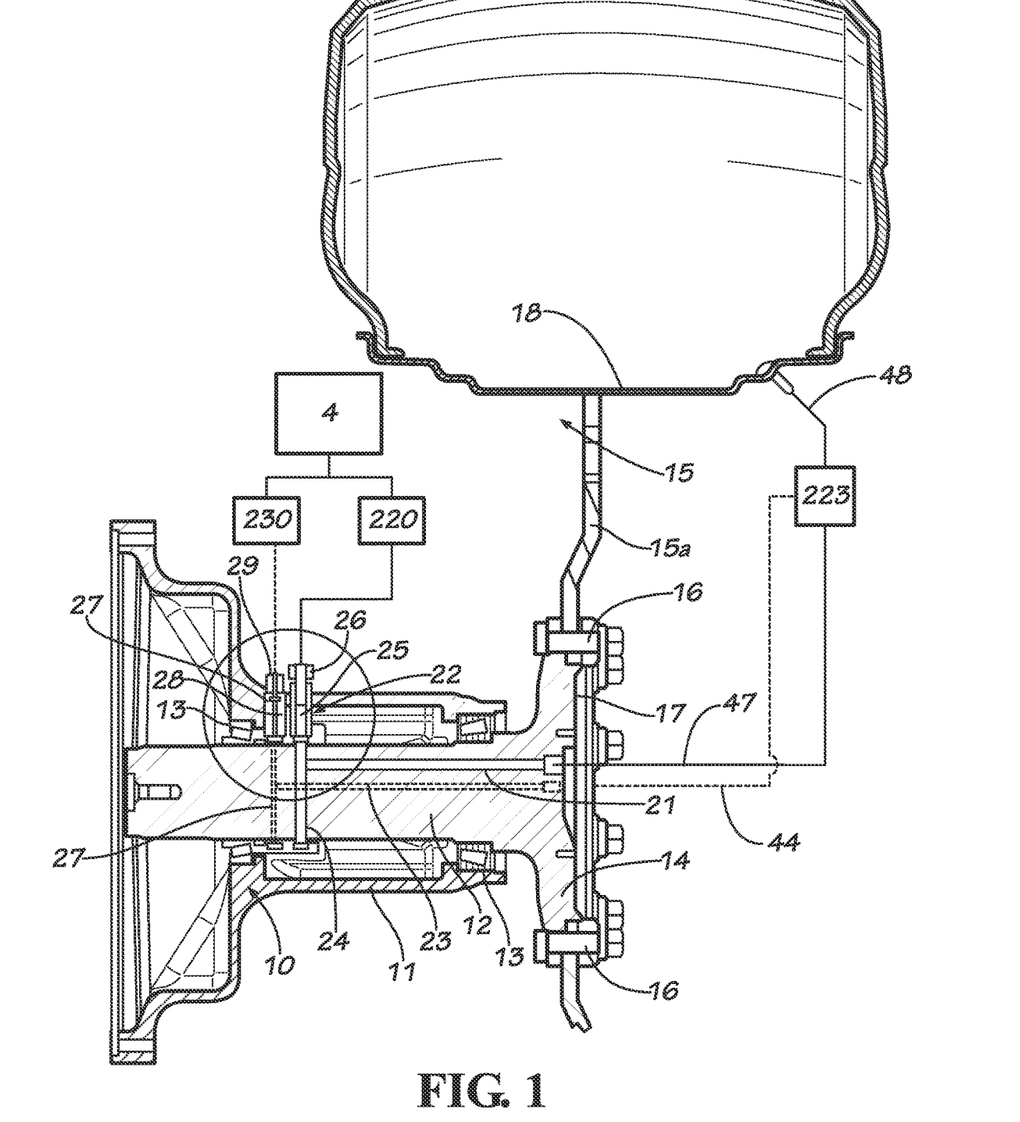
FIG. 1 is an axial sectional view through half of a tractor rear axle fitted with a tire inflation feed arrangement in accordance with the invention.
Figure 2:
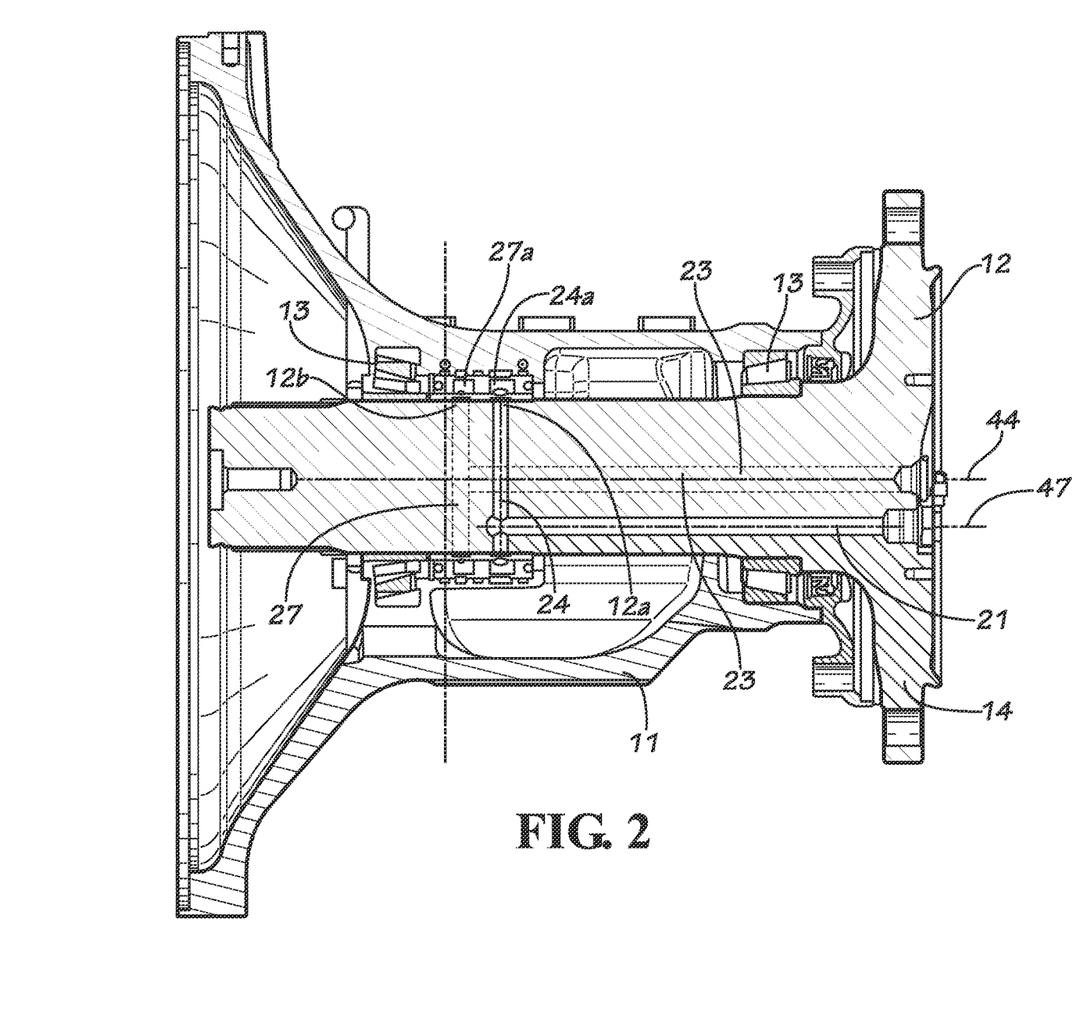
FIG. 2 is a section through the rear axle of FIG. 1 on a larger scale.
Figure 3:
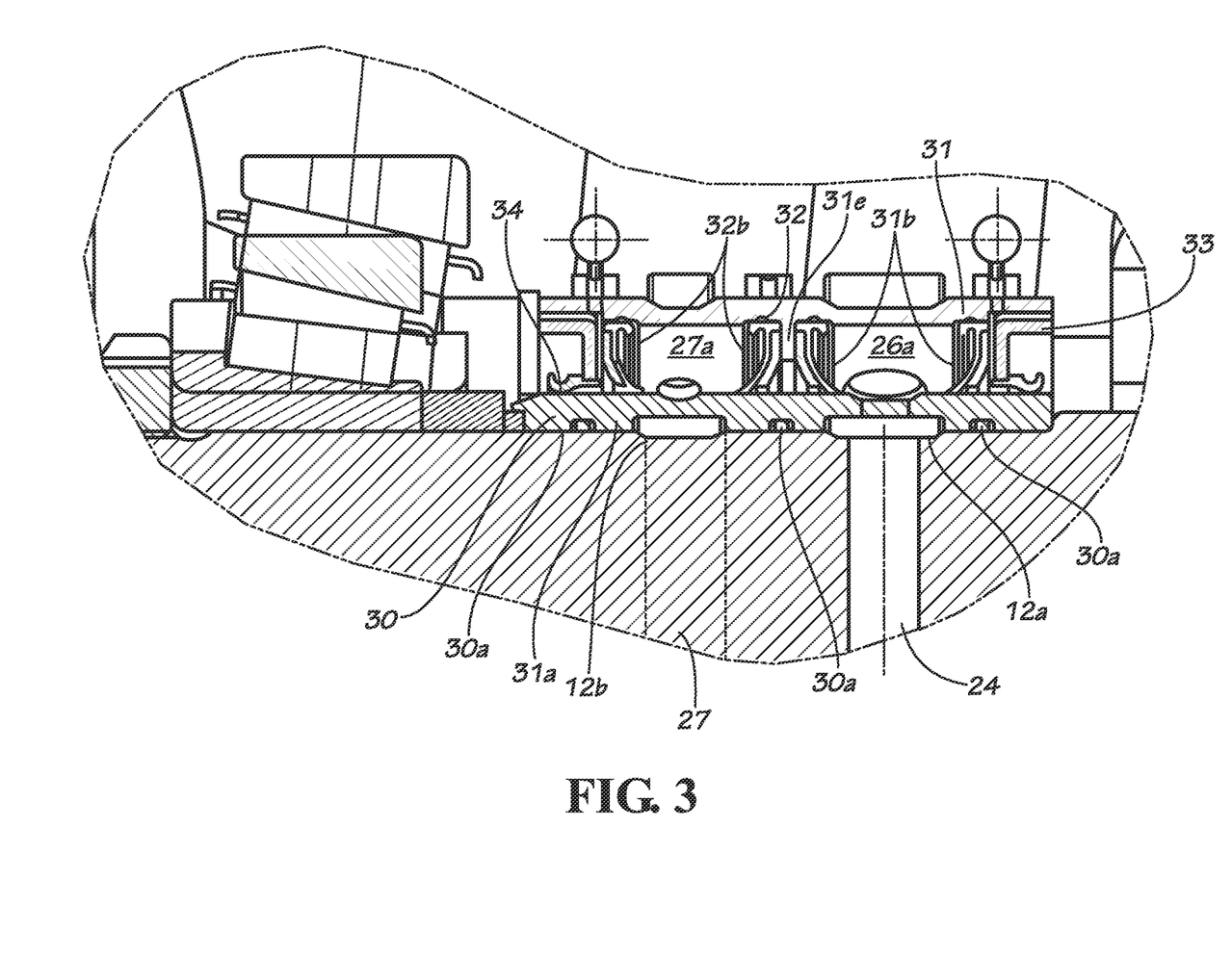
FIG. 3 is part of FIG. 2 on a larger scale.

Referring to FIGS. 1 to 3, a tractor rear axle 10, half of which is shown in cross-section in FIGS. 1 and 2 has an outer trumpet housing 11 within which a driveshaft 12 is supported by bearings 13. Driveshaft 12 terminates in a hub flange 14 to which a wheel disc 15a of a wheel 15 is clamped by bolts 16 and a clamping ring 17.

The wheel disc 15a carries a wheel rim 18 on which a pneumatic tire 19 is mounted. The present invention is concerned with a tire inflation system for conveying compressed air from the tractor air supply system 4 via air control valves mounted on the tractor to the rotating wheel 15 and hence via stop valve 223 mounted on the wheel to the interior of the tire 19 via lines 47 and 48. Air supply system 4 provides air to a control circuit 230 and supply circuit 220 which are explained in greater detail in FIGS. 4 and 5.

The tire inflation feed arrangement 22 which is shown in greater detail in FIG. 2 is provided with two rotatable air passages 240. One rotatable passage 240 comprises a first passage 21 and a first radial feed passage 24. The other rotatable air passage 240 comprises a second passage 23 and a second radial feed passage 27. Each rotatable air passage 240 extends within the shaft 12 from hub 14 to a first and second annular axle zone 12a,12b on the outer periphery of shaft 12 respectively. At the hub end of the shaft, outside of the hub, shaft and shaft housing, first passage 21 connects the rotatable air passage with air supply line 47. Second passage 23 is likewise connected to valve 223 by air supply line 44 outside of the hub, shaft and shaft housing. First radial feed passage 24 extends from first annular zone 12a to first passage. First and second radial feed passages 24, 27 are perpendicularly connected to respective first and second passages 21, 23 which extend inside the enclosed shaft to hub 14. In this way, both the rotatable air passages are fully enclosed within the rotatable shaft 12 and trumpet housing 11.

A contact component 30 surrounds annular zones 12a and 12b and is sealed to shaft 12 by seals 30a. Contact component 30 formed from, or coated with plastics material such as PTFE or could be made from stainless steel or could be hardened by nitrogen to resist wear. Radial passages 24 and 27 emerge through contact component 30 forming first feed through chamber 24a and second feed through chamber 27a. A holding element in the form of a surrounding casing 31a provided with sealing means 31, 32 is attached to the axle housing, or non-rotatable part. The sealing means when in contact with the contact component 30 provides a through passage with the rotatable air passage so that when the rotatable passage is pressurised, the through passage is also pressurised and ensures the integrity of the sealing means with the contact component 30. The seals come into contact with the contact means 30 on the axle shaft around annular zones 12a, 12b. Pipes 25 and 28 extend from the exterior of the axle housing, or non-rotatable part of the vehicle through the axle housing to the casing 31a. They may be screwed to the casing 31a. With this arrangement there is a free, open passage from the surface of the axle housing, through pipes 25, 28, through the radial zones 12a, 12b, through the rotatable air passage to the hub 14. At the exterior of the axle housing pipes 25 and 28 are provided with pipe fittings 26, 29 which are connected by respective lines to supply circuit 220 and control circuit 230. Pipes 25, 28 may be made from stainless steel, or, brass, or some other non corroding material. Pipes 25, 28 and pipe fittings 26, 29 and respective seals to provide air-tight connection are not shown in FIG. 3 as they are not relevant for the invention.

First sealing means 31 is mounted in casing 31a into which pipe 25 is screwed. Sealing means 31 includes a pair of seals 31b on either side of first feed through chamber 24a which, when first feed through chamber 24a is pressurised are forced into sealing contact with the contact member 30 to seal the flow of air to passages 21,24. A shaft seal 33 is also provided in casing 31a to prevent the ingress of oil and dirt around axle 12.

Similarly, second sealing means 32 is also mounted in casing 31a into which pipe 28 is screwed. Sealing means 32 includes a pair of seals 32b are provided on either side of second feed through chamber 27a which, when second feed through chamber 27a is pressurised are forced into sealing contact with the contact component 30 to seal the flow of air to passage 23, 27. A shaft seal 34 is also provided in casing 31a to prevent the ingress of oil and dirt around axle 12.

The two sealing means 31 and 32 are located side by side with shaft seals 33 and 34 axially outermost relative to the two annular axle zones 12a and 12b. A spacer 31e is built into casing 31a between the sealing means.

Use of a separate contact component 30 allows relatively easy replacement of the contact member if it becomes worn due to the contact pressure of sealing means 31 and 32 without the need for replacement of the expensive wheel flange 14 and associated shaft 12.

Although in the embodiment described the seals 31 and 32 are carried by housing 11 and the contact member 30 is mounted on shaft 12, this arrangement could be reversed if desired. Furthermore, any other sealing means wherein the sealing contact is provided by pressurising a respective passage can be used instead of the embodiment shown in FIGS. 1 to 3. Additionally, the radial passage as shown above could be replaced by an axial feed through arrangement as shown in applicant's patent applications GB1016661.9 or GB1016662.7.

Figure 4:
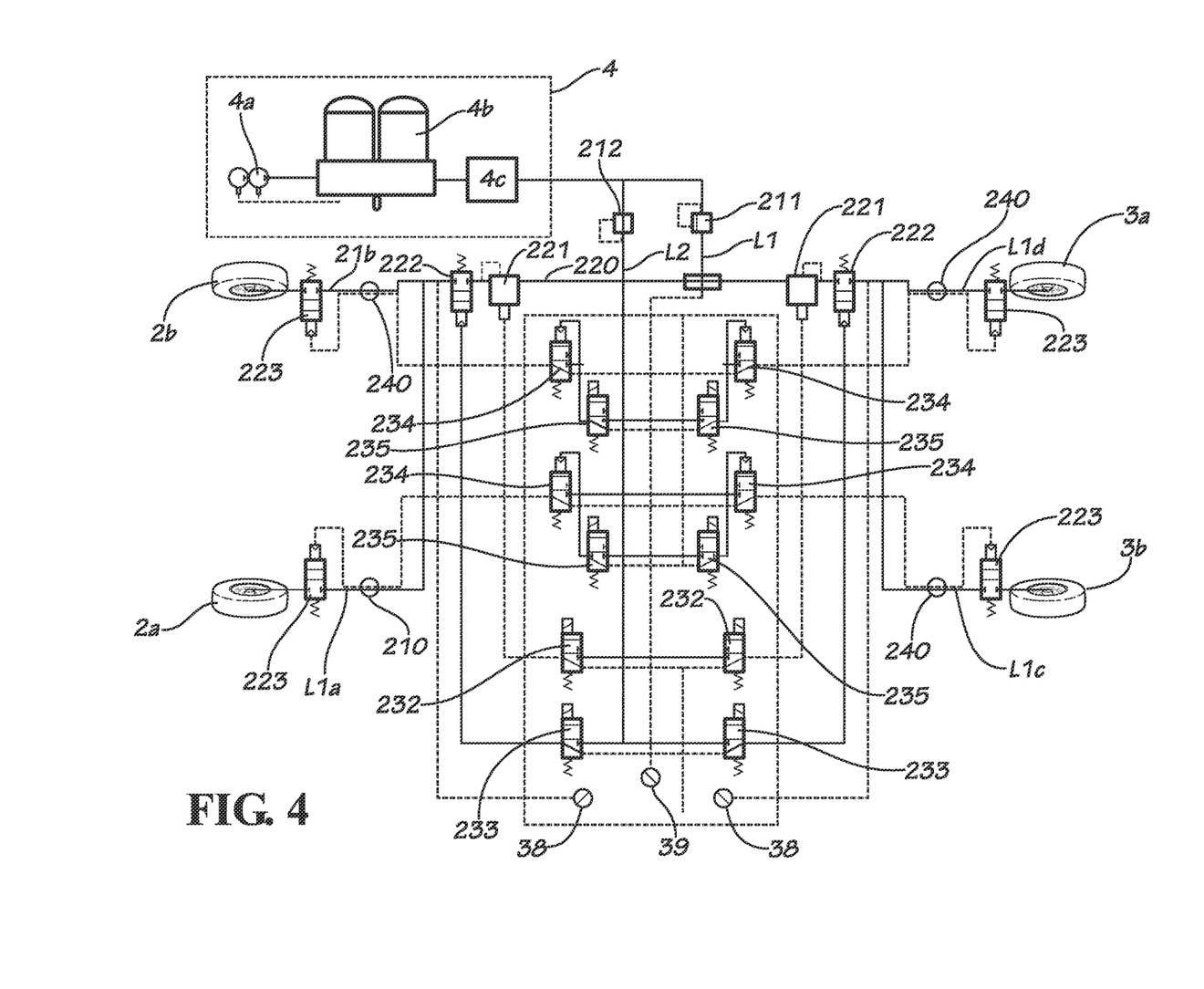
FIG. 4 shows a pneumatic circuit diagram of the tire pressure control system (TPCS) in accordance with the present invention.

FIG. 4 details the supply and control circuits 220 and 230 respectively on a tractor 1. The tractor 1 is provided with: left and right front wheels 2a, 2b, left and right rear wheels 3a, 3b, a tire pressure control system (TPCS) and a tractor air supply system 4 comprising a compressor 4a, air drier 4b, a protection valve means 4c.

The tractor air supply system 4 has a compressor 4a which supplies consumers via an air drier 4b. The air drier 4b includes a reservoir to store compressed air and a granule cartridge to extract water from the air. A pressure limiting valve restricts pressure levels to a maximum of approximately 8.5 bar. Typical consumers are, for example, the tractor braking system, the trailer braking system or a front suspension (not shown) in which these consumers are primary consumers as their function is relevant for safety. A secondary consumer is the TPCS. A protection valve means 4c balances the pressure required to be supplied to the primary set of consumers and will cut the supply to any consumer should a consumer develop a leak. In this way the integrity of the remaining primary consumers is maintained. Furthermore, protection valve means 4c ensures that supply to primary consumers is prioritised over the supply to secondary consumers, such as the TPCS.

The tractor air supply system 4 solely serves the purpose to supply air to the TPCS at a specific pressure level, for example 8.5 bar and at a sufficient air flow to ensure acceptable inflation time during operation. The term air flow is taken to mean the volume of air per unit time. The tractor air supply system 4 could be replaced by any other air supply system, for example, a system such as that described in the Applicant's published patent application WO 2011/001261, or EP 2 340 974 which serves the same purpose having an additional compressor parallel to an internal compressor.

The tractor air supply system 4 is connected to the TPCS via an excess flow valve 211 which is set to a minimum pressure level of, for example, between 7.1 to 7.5 bar. If the pressure level in the line L1 drops below the set level, for example, if a break in the line occurs, the connection is blocked to protect the tractor air supply system 4 from complete air discharge.

A second connection between the air supply system 4 and the TPCS is further provided via a pressure relief valve 212 which limits the pressure in line L2 to a level between 4.5 to 5 bar. The need for this second pressure level is explained later on.

Generally, the TPCS comprises two separate circuits which represent two functions of the system.

Figure 5:
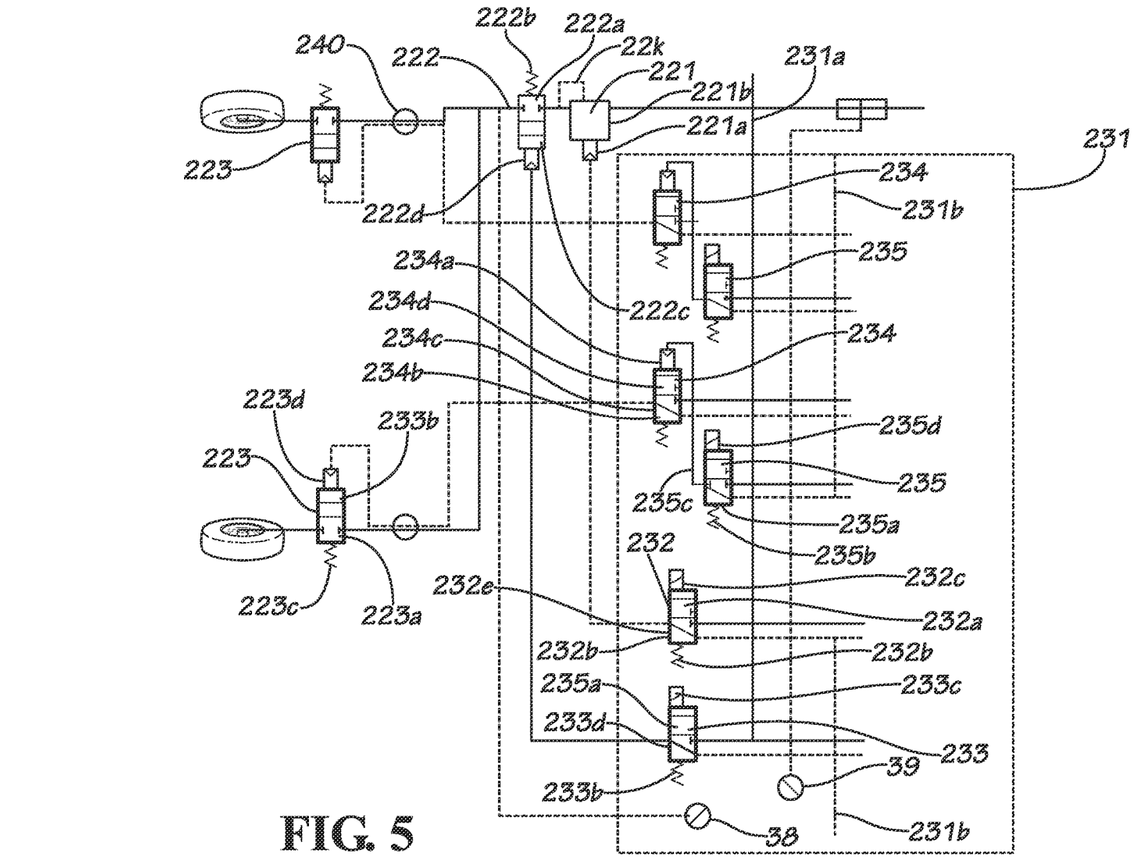
FIG. 5 shows the pneumatic circuit diagram of FIG. 4 in further detail.

One circuit is the supply circuit 220 which is depicted with continuous lines in FIGS. 4 and 5 and which provides an air supply to the tire. This circuit must be capable of delivering large air flow rates at a maximum pressure level to ensure fast inflation of a tire.

A second circuit, control circuit 230 as shown with the broken line in FIGS. 4 and 5 is provided for activating the deflation and inflation components which are controlled by the pilot valve of the supply circuit 220. Compared to the pressure in the supply circuit 220, the pressure in the control circuit 230 is lower owing to pressure relief valve 212. In addition, all components of the control circuit are specified for a smaller air flow as the pilot function requires only small air flows. The lower pressure level and air flow in control circuit 230 enables the use of smaller and cheaper components, especially valves, which improves procurement, costs and installation space. Furthermore, the lower pressure level enables higher accuracy when sensors are installed, as the accuracy is decreased with a greater range of operation.

The TPCS is similar for the front and rear axle (and mostly the same for each tire).

FIG. 5 shows FIG. 4 in greater detail in which the components related to rear wheels 3a, 3b and to the tractor air supply system 4 have been omitted.

The supply circuit 220 is provided with two main control valves 221 (one assigned to front tires 2a,2b and the other assigned to rear tires 3a, 3b) to regulate the pressures in the tires. The main control valves 221 have two different operating conditions and may be controlled pneumatically, or electronically. In a first condition, the supply lines (that is the air supply lines connected to line L1) are connected (for inflation) and a second condition in which the supply lines are connected to ambient atmosphere (for deflation). Tire supply lines L1a, L1b, L1c and L1d, connect the second stop valves 222 to each tire. Each of the second stop valves (or second valve means) 222 is connectable to supply line L1 for inflation and to the atmosphere for deflation.

Second stop valves 222, are biased by a spring means 222b and can be moved into a position 222a to close the valve (as shown in FIG. 5) and block air flow, or can be moved to an open position 222c to allow air flow. The valves 222 may be moved into the open position 222c against the force of spring 222b pneumatically by charging port 222d.

For each tire, air will pass through first radial feed passage 24 and passage 21 (being part of the rotatable passage 240) for inflating and deflating a tire as shown in FIGS. 1 and 2.

Each tire has a respective valve 223 in its tire supply line. Respective valves 223 are also controlled pneumatically and can be moved into two positions, open and closed. A closed position 223a is shown in FIGS. 4 and 5 in which it is biased by spring 223c to block the air flow to and from the tire. By charging port 223d, the valve can be moved against the spring 223c into an open position 223b to connect the interior of the tires 2a, 2b, 3a, 3b to the supply line.

Valves 221, 222 and 223 are controlled pneumatically by control circuit 230. All means for controlling the valves are integrated in a pilot valve manifold 231 as shown by the dotted lines. Pilot valve manifold 231 is connected via port 231a to pressure relief valve 212 to receive air at a reduced pressure of between 4.5 to 5 bar. Ports 231b enable the discharge of air to the atmosphere. Each valve installed within pilot valve manifold 231 is connected to the respective ports to supply air or to discharge air to the atmosphere. Pilot valve manifold 231 is also connected to the tractor control unit (not shown) to control the TPCS. Alternatively, pilot valve manifold 231 may be equipped with its own control unit receiving required parameters from the tractor control unit.

Main control valves 221 are pilot controlled by first pilot control valves 232 which are designed as a three port/two way valve. Valves 232 move into position 232a against spring 232b when solenoid 232c is activated. When port 232d is charged with air, port 221a is also charged with air so that main control valve 221 is opened. The valve is biased towards the second position 232e by spring 232b wherein port 232d is connected to the atmosphere so that main control valve 221 is moved to a position in which port 221b is connected with the atmosphere (for deflation).

In a mid position, main control valve 221 blocks the connection. The mid position is provided if the pressure charged via line 221c is balanced with the pressure charged via port 221. Due to the simple and cheap design of the valve, this mid position cannot be adjusted permanently, so that valve 221 cannot be provided for controlled blocking of the connection.

Stop valves 222 are pilot controlled by second pilot control valve 233. Depending on its position, the stop valves 222 are opened or closed. The position 233a of second pilot control valve 233 shown in FIGS. 4 and 5 is biased by spring 233b. If solenoid 233c is activated, port 233d and thereby port 222d is charged with air so that stop valves 222 are opened to position 222c. In the second position 233e, port 233d and thereby port 222d is connected to the atmosphere and stop valves 222 are moved into position 222a by spring 222b so that air flow through stop valves 222 is blocked.

As respective valves 223 are installed on the tires, the connecting pipes to the pilot valve manifold 231 are much longer compared to the connection of main control valves 221 and second stop valves 222. As a result the overall resistance due to the rotatable passages and longer lines is greater, necessitating further third pilot control valves which have a greater air flow capacity. This greater air flow increases the pressure peak through the rotatable passage as the respective valve 223 blocks the air flow (when in position 223a) so that the back pressure increases the pressure level in the rotatable feed through. Since valves having the required air flow capacity are not available with solenoid control, or are very expensive and spacious, third pilot control valves 234 are also pneumatically pilot controlled and are connected to a fourth pilot control valve 235 which has a similar air flow capacity to first pilot control valve 232 and second pilot control valve 233. Fourth pilot control valves 235 is also solenoid-controlled. Third pilot control valves 234 and fourth pilot control valves 235 provide a two-stage pilot control for respective valves 223 working as following:

Fourth pilot control valves 235 are kept in position 235*a* by spring 235*b* so that port 235*c* is connected to the atmosphere. As port 235*c* is connected to port 234*a*, third pilot control valves 234 is kept in position 234*b*. In this position, port 234*c* is connected to the atmosphere so that respective valves 223 remain in blocked position 223*a*. If solenoid 235*d* moves fourth pilot control valves 235 into position 235*e*, port 234*a* is charged with air moving third pilot control valves 234 into open position 234*d*. In this position, port 234*c* is connected to an air supply so that respective valves 223 are moved to open position 223*b*. Third pilot control valves 234 and fourth pilot control valves 235 are provided for each tire.

The details relating to the pilot control within the pilot valve manifold 231 are not generally relevant for the invention and may be designed in various layouts. Solenoid-controlled valves replacing valves 221, 222 and 223 may obviate the need of any pilot control.

In addition, pilot valve manifold 231 comprises two pressure sensors 38, 39, whereby first pressure sensors 38 are connected in the line between second stop valves 222 and respective valves 223. Second pressure sensor 39 is connected in the line before second stop valves 222 and main control valves 221 of each axle wherein the direction of flow of air is taken to flow from valve 221 to valve 222 to valve 223. The function of both sensors is explained later on.

During operation of the tractor and when the TPCS is in stand-by mode, respective valves 223 are in closed position 223*a* to close the tire volume.

The term operation of the vehicle or machine is defined herein as meaning that the vehicle or machine is in a condition where its system or systems are sufficiently powered for operation, for example, with the engine running. The term shut down of the vehicle is defined herein as meaning that the vehicle or machine is in a condition that its system or systems are not sufficiently powered for operation e.g. with ignition key is removed.

Referring to TPCS the term stand-by mode is defined herein as meaning that the TPCS is in a condition wherein no change in tire pressure is done by the driver or an automatic control system but measurements or monitoring functions may be done. The TPCS Active mode is characterised by any change in tire pressure.

If the vehicle is not in operation (shut down), TPCS is also out of operation as supply of any electric or pneumatic energy supply is cut. Consequently, in this condition the TPCS is not in stand-by, nor in Active mode.

If the tire pressure is adjusted (by manual input by the driver or an automatic control system), respective valves 223 (for the respective tires) are opened.

If the tires are inflated (tire pressure is increased), main control valves 221 are adjusted so that the tire is connected to the tractor air supply system 4 and the tire is charged with air. Depending on the design, the pressure adjustment may be done in two ways. In one way, main control valves 221 are fully opened until the tire pressure, monitored by first pressure sensor 38 reach the demanded value. Alternatively, in another way, main control valves 221 may be opened to a position corresponding to the required pressure. The tire pressure is fed back via line 221*c* and closes when the value is reached. In case of deflation, main control valves 221 are moved into a position in which port 221*b* is connected with the atmosphere. Air can be discharged to the atmosphere until the demanded pressure value, monitored by first pressure sensor 38, is reached.

Furthermore, the feed back via line 221*c* ensures that the pressure level in the supply circuit after the main control valve 221 does not exceed 4.5 to 5 bar as the pressure in line 221*c* counteracts against the pressure coming from pilot circuit via port 221*a* which is set to a maximum of 4.5 to 5 bar. This balancing ensures that the tires are not charged with more than 5 bar which represents an acceptable pressure level.

The supply circuit 220 of the TPCS is provided with two different pressure levels:

Between supply system 4 and main control valve 221, one pressure level, hereinafter referred as tractor supply pressure, can reach up to 8.5 bar.

Between main control valve 221 and tire 2*a*, 2*b*, 3*a*, 3*c*, the pressure level is limited to 5 bar hereinafter referred to as TPCS supply pressure.

At the end of any inflation or deflation process, respective valves 223 are moved to a closed position 223*a*.

Tire supply lines L1*a* and L1*b* which are supply lines for two tires 2*a*, 2*b* respectively on the front axle are connected to pressure sensor 38. Tire supply lines L1*d* and L1*c* which are supply lines for tires 3*a*, 3*b* respectively on the rear axle are connected to another pressure sensor 38.

Each supply line L1*a*, L1*b*, L1*c* and L1*d* is therefore the pneumatic connection between the respective valves 223 associated with each tire 2*a*, 2*b*, 3*a*, 3*c* and the second stop valve 222. Supply line L1*a* is permanently connected with supply line L1*b* and supply line L1*c* is permanently connected with supply line L1*d*.

To measure the tire pressure of tire 2*a*, the respective valve 223 associated with tire 2*b* is closed and the respective valve 223 associated with tire 2*a* is opened so that air from tire 2*a* flows from the tire along supply line L1*a* to second stop valve. If valve 222 is closed, then after a period of time the air pressure in the supply line L1*a* becomes static and reading on pressure sensor 38 which is the pressure of tire 2*a* can be recorded.

If the opening and closing of the respective valve 223 is controlled by a tractor control unit, the respective valve 223 can be opened automatically for a defined period of time before closing to achieve a static pressure in the respective supply line. An appropriate time period for the valve 223 to be open is under 500 ms. Thereby the measurement does not have any impact on the absolute tire pressure itself, as the volume passing through valve 223 to the sensor 38 is very small compared to the tire volume, so that the losses in the tire are negligible.

To check the pressure of each tire, the driver closes second stop valve 222 on the axle associated with the tire which is to be checked, the respective valve 223 of the tire on that axle which is not to be checked is then closed. The respective valve 223 of the tire to be checked is then opened. Valve 223 may be opened automatically for a set period of time before closing or the diver may keep valve 223 open until a steady reading on the pressure sensor 38, indicating a static pressure is reached. The tractor control unit may record this reading, or the driver may note it down him/herself.

In accordance with the present invention, a method of monitoring a reference pressure is described below:

The second stop valve 222 is opened while the respective valves 223 of each tire are closed. The control valve 221 is adjusted to provide a reference pressure in the supply line L1a, L1b, L1c, L1d. Control valve 221 is adjustable to air supply system 4 and so the pressure in the supply line L1a, L1b, L1c, L1d is set to the TPCS supply pressure. Valve 222 is then closed and the reference pressure for each supply line is measured by pressure sensors 38. If there is a decrease in the reference pressure of any of the supply lines within a relatively short, pre-determined period of time, for example, 2 seconds then this indicates that there is a leak in the supply line, or that there is a leak in either the respective valve 223 or the second stop valve 222.

The method can be followed using the steps below:
1. The respective valves 223 of tires 2a, 2b are closed
2. The second stop valve 222 is opened while and the control valve 221 is adjusted to provide a reference pressure in the supply line L1a, L1b by connecting to supply system 4.
3. The second stop valve 222 is closed.
4. The system monitors the reference pressure for relatively short, predetermined period of time (for example, 2 seconds). If there is no decrease of the pressure level, the system is free of failure/leakage. If not, a warning may be generated. Measurement of the tire pressure is aborted.
5. Before measurement, second stop valve 222 is opened and connected to ambient via control valve 221.
6. The second stop valve 222 is closed again.

The operator or the TPCS can quickly test whether there has been an increase or decrease of the reference pressure of each supply line, either periodically or on demand. This is achieved by monitoring the pressure in each supply line over a pre-determined period as previously described. The monitoring process could also be conducted prior to the tire pressure measurement. The tractor control unit could be configured to generate a warning signal for the driver if there is any decrease or increase in the reference pressures of each supply line.

In the shown embodiment, the invention is realised by installing main control valves 221 and second stop valves 222 in series. It is envisaged that the function of both valves 221, 222 could be combined into one valve, either 221 or 222.

The invention claimed is:

1. A tire pressure control arrangement for a vehicle having at least two tires connected to an air supply, each tire connected to an air supply via a respective supply line having a respective valve, said respective valve connected to a second valve, said arrangement further comprising a pressures sensor between said respective valve and the second valve, characterized in that the respective valve is closed while the supply line is connected to a reference pressure supply and said reference pressure in the supply line is monitored for a pre-determined period of time by a control system on the vehicle to detect whether there are any leaks in the arrangement.

2. The tire pressure control arrangement as claimed in claim 1 wherein the supply line is connected to the reference pressure supply by connecting the second valve to a vehicle air supply, or to the atmosphere.

3. The tire pressure control arrangement as claimed in claim 1 wherein the supply line is connected to the reference pressure supply by connecting a main control valve to a vehicle air supply or to the atmosphere, said main control valve being connected to the second valve.

4. The tire pressure control arrangement as claimed in claim 1 wherein the second valve is closed after connection to the reference pressure supply.

5. The tire pressure control arrangement as claimed in claim 1 wherein when the respective valve and the second valve are closed, the reference pressure between the respective valve and the second valve is measured and if a decrease or increase in pressure is detected, a warning signal is generated.

6. The tire pressure control arrangement as claimed in claim 1 in which the vehicle comprises four tires, each having a respective supply line with respective valve connectable to the pressure sensor.

7. The tire pressure control arrangement as claimed in claim 1 in which two tires or one axle are connected to a first main control valve and a further two tires, or a second axle are connected to a second main control valve.

8. A method of using the tire pressure control arrangement as claimed in claim 1 wherein the second valve is opened while the respective valve is closed to provide the reference pressure in the supply line and said reference pressure is monitored for a pre-determined period of time by the control system on the vehicle.

9. The method of using the tire pressure control arrangement as claimed in claim 8 wherein a warning signal is generated if the reference pressure in the supply line changes within said pre-determined period of time indicating a leak in the supply line, or the respective valve, or the second valve.

10. The method of using the tire pressure control arrangement as claimed in claim 8 wherein the supply line is connected to the reference pressure supply by connecting the second valve to the supply line or to atmospheric pressure.

11. The method of using the tire pressure control arrangement as claimed in claim 8 wherein the supply line is connected to the reference pressure supply by connecting a main control valve to the supply line, or to atmospheric pressure.

12. The method of using the tire pressure control arrangement as claimed in claim 8 wherein the second valve is closed after the supply line has been connected to the reference pressure supply.

* * * * *